United States Patent [19]

Tabah

[11] 4,290,560

[45] Sep. 22, 1981

[54] MACHINE FOR MAKING PURE PEANUT BUTTER

[76] Inventor: Victo V. Tabah, 431 Burnside Ave., Apt. 11-J, Los Angeles, Calif. 90036

[21] Appl. No.: 70,139

[22] Filed: Aug. 27, 1979

Related U.S. Application Data

[63] Continuation-in-part of Ser. No. 959,593, Nov. 13, 1978, abandoned.

[51] Int. Cl.³ ............................................... B02C 7/04
[52] U.S. Cl. ...................................... 241/65; 241/246; 241/248; 241/258; 241/261
[58] Field of Search ........... 241/244, 246, 248, 257 R, 241/258, 261, 260.1, 65, 88.4, 261.3

[56] References Cited

U.S. PATENT DOCUMENTS

3,527,277  9/1970  Woods ............................... 241/88.4
4,027,824  6/1977  Fuller ........................... 241/260.1 X
4,201,349  5/1980  Walsh .............................. 241/261 X

*Primary Examiner*—Mark Rosenbaum
*Attorney, Agent, or Firm*—Herzig & Walsh

[57] ABSTRACT

A machine for grinding nuts, more particularly peanuts and for making pure peanut butter. A hopper is provided for the peanuts. The peanuts are delivered to grinding discs, one of which is rotated. The peanuts are delivered through a tubular passageway having in it a member with a helical rib for forcibly delivering the peanuts to the grinding means. The ground material, namely, the peanut butter, after passing the grinding means is delivered into a removable cup. Heat is applied automatically to provide temperature for proper operation of the machine. Preferably, the machine is automatic and is coin operated.

11 Claims, 13 Drawing Figures

| PLACE CUP ON PLATFORM | CLOSE DOOR | SELECT | | DROP QUARTER 25¢ | OPEN DOOR REMOVE CUP |
|---|---|---|---|---|---|
| | | CREAMY | CRUNCHY | | |

Fig. 13

MACHINE FOR MAKING PURE PEANUT BUTTER

This application is a continuation-in-part of Ser. No. 959,593, filed Nov. 13, 1978, now abandoned.

BACKGROUND OF THE INVENTION

1. Field of the Invention

The field of the invention is that of machines and techniques for grinding nuts for purposes of making nut butter, in this instance, the machine being particularly adapted for making completely pure peanut butter.

2. Description of the Prior Art

It is considered that the combination of the machine and the particular technique involved in the handling of the nuts is unique in the art. Prior U.S. Pat. No. 3,165,127 is known however, this patent disclosing a machine for delivering and dispensing peanut butter not being relevant otherwise to the machine and technique of the herein invention as described in detail hereinafter.

SUMMARY OF THE INVENTION

A preferred exemplary form of the invention is described in detail hereinafter. In the preferred form, a hopper for peanuts is provided at the upper part of the machine. Below the hopper, there is provided a tubular passageway or channel for delivering peanuts to the grinding means. Provided in the passageway is a delivery element in the form of a stem having a helical rib so as to convey or deliver the peanuts to the grinding means positioned at the lower end of this stem. Heat is applied at a position adjacent to the lower part of the hopper so that the peanuts are delivered at a proper temperature to be adequately lubricated for purposes of being ground. A lower heater is provided adjacent to the grinding means, and the position of delivery of the peanut butter is such that it will be at a consistency to make it readily flowable into a cup.

The grinding means is in the form of grinding discs having interleaving teeth and grooves. The discs do not rub against each other.

The delivery stem, having a helical rib, is driven by a motor which is positioned within the hopper. The nuts are forced into the center of the grinding means, and then outwardly between them and then inward again to be delivered at the center.

Preferably, as will be described, the machine is organized so as to be fully automatic and preferably, it may be controlled by a coin operated mechanism.

In the light of the foregoing, the primary object of the invention is to realize a simplified and effective machine for purposes of grinding nuts, more particularly peanuts, in order to provide completely pure and unadulterated peanut butter without the services of an attendant.

A further object is to realize a machine as in the foregoing which is provided with a hopper, with positive delivery means for delivering peanuts to a grinding means incorporated in the machine and with means for receiving the peanut butter so produced.

A further object is to realize effective grinding means is the form of discs having tooth configurations adapted for producing butter.

A further object is to achieve effectiveness in the process or technique of making the peanut butter by way of providing heat sources at suitable positions in order to realize proper grinding of the peanuts and delivery of the peanut butter to a jar or container.

A further object is to realize a machine as described which is motor driven, and which is adapted to electrical control responsive to coin operated mechanism.

A further object is to provide a machine as in the foregoing, which includes apparatus whereby the machine can operate either in a mode to dispense creamy peanut butter or crunchy peanut butter. The crunchy product being produced by feeding unground nuts into the creamy product.

A further object is to realize an operable automatic control system for the peanut butter machine, operative in response to a coin controlled mechanism and including circuitry, whereby either the mode of operation can be selected and whereby the machine will go through a desired operating cycle, after the cycle has been initiated by the coin controlled mechanism.

Further objects and advantages of the invention will become apparent from the following detailed description and annexed drawings.

DESCRIPTION OF THE PREFERRED EMBODIMENT

Figure 1:
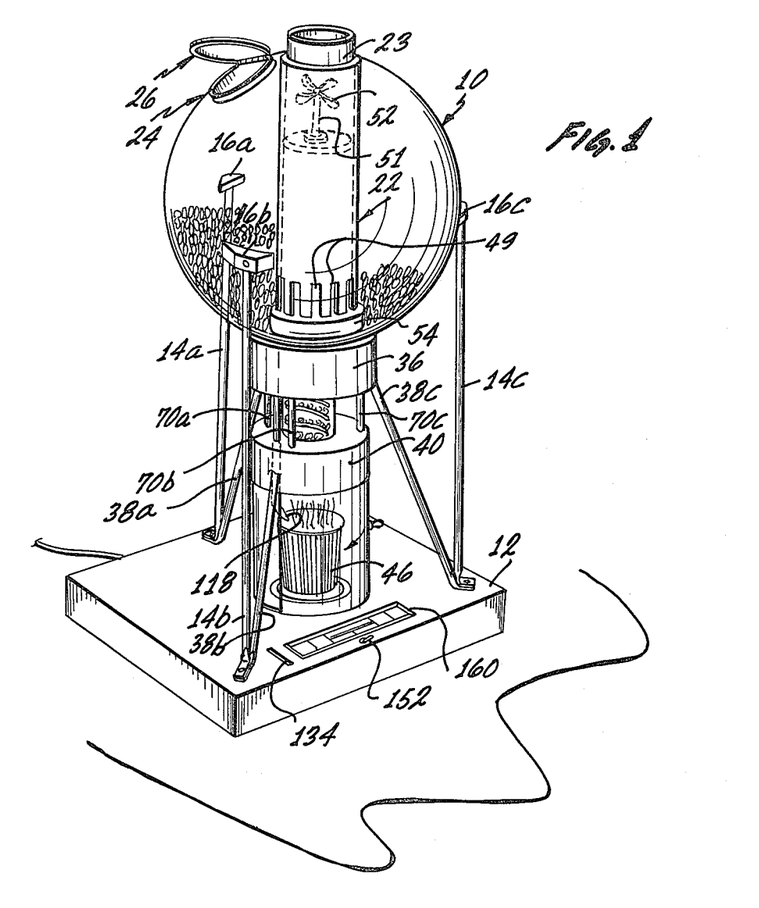
FIG. 1 is a pictorial view of a preferred form of the invention.

FIG. 1 of the drawings is a pictorial view of the preferred form of the invention. Numeral 10 designates a hopper which, as shown, is of globular shape and it may be transparent. Numeral 12 designates a rectangular base made of suitable material on which the machine is supported. Numerals 14a, 14b and 14c designate vertical supporting or tripod legs which have flanges at the bottom suitably secured to the base 12. At the upper ends of these legs are shoes 16a, 16b and 16c shaped to engage sides of the hopper 10 for holding it in position.

Within the hopper 10 is a cylindrical housing 22 which will be referred to again presently. The hopper 10 has a top opening, at the left of cylindrical housing is an opening having a cylindrical sidewall 24, the top having a hinged cover 26. The housing 22 extends through the top opening of the hopper. A second housing concentric with housing 22 extends above housing 22, as designated by numeral 23.

As may be seen in FIG. 1, below the hopper 10, the machine has a cylindrical part 36. There are additional support legs 38a, 38b and 38c which extends upward and inwardly from the feet of the legs 14a, 14b and 14c to the periphery of the cylindrical part 36. Below the cylindrical part 36 is another cylindrical housing part 40 which will be referred to again presently. Below the part 40 there is a supporting semi-circular closure member 44 and a semi-circular movable door or closure member 42. Numeral 46 designates a cup or jar in which the peanut butter is received as will be described more in detail presently.

Figure 2:
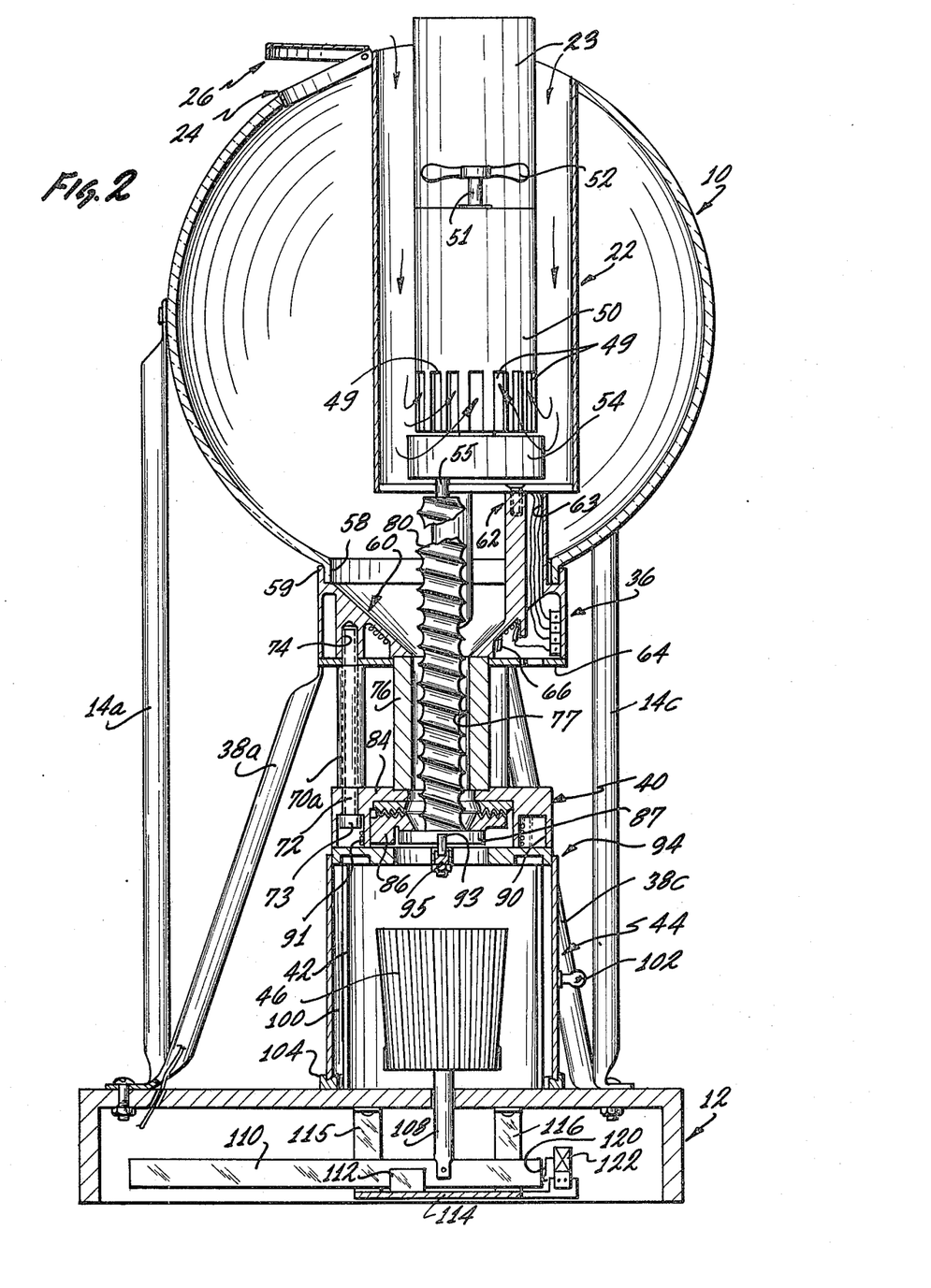
FIG. 2 is a sectional view of the machine of FIG. 1.

The cross-sectional view of FIG. 2 shows the machine in greater detail. Within the housing 22 is an electrical motor 50 having a shaft 51 on which is mounted a fan or impeller 52 inside housing 23 for circulating air upward from the motor 50 and out through the top of the housing 23 for cooling the motor. Numeral 54 designates a gear train which is driven by the motor, the gear train having an output shaft 55. Motor 50 has air inlet openings 49. The air flows as shown by the arrows.

The cross-sectional configuration of the cylindrical part 36 may be seen in FIG. 2. The hopper 10 has a circular flange 58 at the bottom which fits inside a top flange 59 at the top of the cylindrical portion or member 36. The interior of the part 36 is cone-shaped as may be seen at 60. The part 36 has vertical upstanding members or parts, one of which is designated at 62. In a preferred construction, two or three of such upstanding parts may be provided, only one being shown schematically in FIG. 2. The housing 22 and motor assembly is supported from these members, being attached to them by screws as shown. The member 62 has a vertical side channel in it as designated at 63 to accommodate electrical wiring passing to the motor 50 from terminal members as designated at 64. On the underside of the conical surface 60, there is an electrical heating element, as designated at 66, which connects to one of the terminals 64.

As previously stated, the cylindrical part 40 is below the cylindrical part 36. It is spaced from the part 36 by way of three cylindrical tubular spacers as designated at 70a, 70b and 70c. Within the tubular spacer 70a is a bolt member 72 having a head 73. The bolt 72 extends through an axial bore in the part 40, the head 73 being in a counterbore and the end of the bolt being threaded into a threaded bore 74 in the part 36, as may be seen in FIG. 2. Similar holding bolts are provided in the other two tubular spacers.

Extending between the parts 36 and 40 and axially aligned therewith is a tubular member 76 having bore 77. Extending through the bore is a driving or conveyor element for delivering the peanuts in the form of a stem member having a helical rib as designated by the numeral 80. This member is on the shaft 55 and is driven as indicated. The peanuts are delivered between the stem 80 having a helical rib and the bore 77 of the cylindrical member 76.

Figures 8, 9, 10:
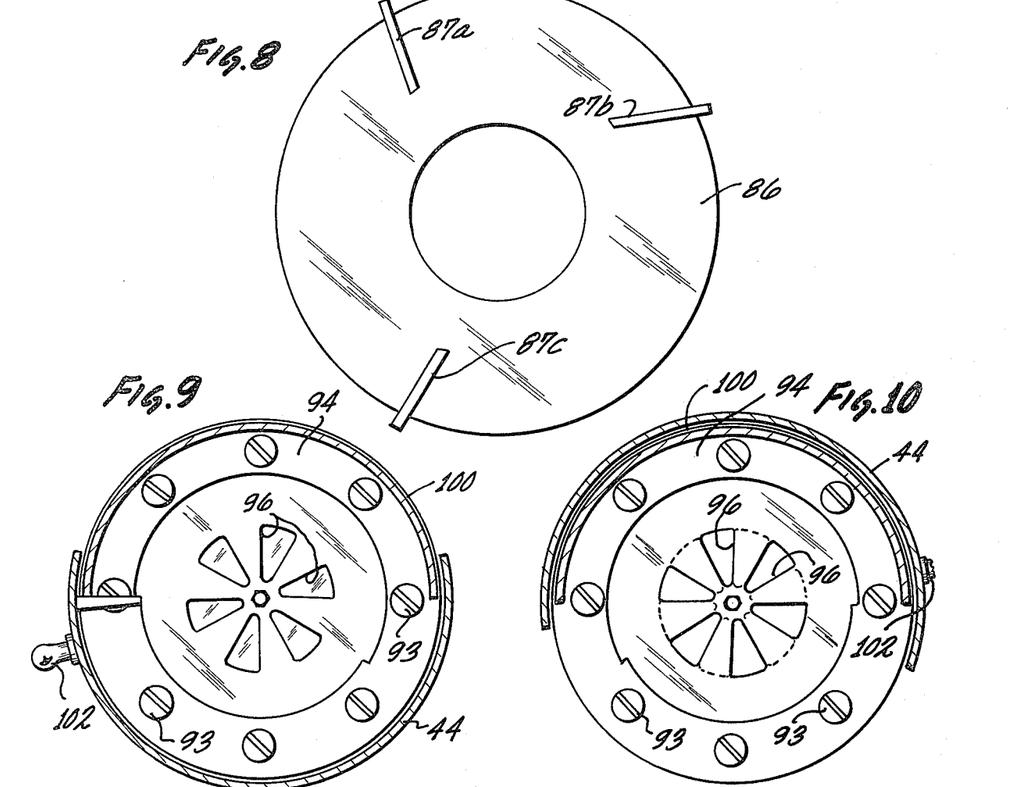
FIG. 8 is a bottom view of the rotary grinding disc.
FIGS. 9 and 10 are views of open and closed positions of the circular door or closure positioned around the cup that receives the peanut butter.

The grinding mechanism is within the part 40. It includes a fixed grinding disc 84 which is within a recess in the body of the part 40 and is secured thereto. Numeral 86 designates a second grinding disc which is secured to the end of the stem 80, along with another disc as designated at 87. FIG. 8 shows the bottom side of the grinding disc 86, it having a group of three angularly positioned axial vanes as designated at 87a, 87b and 87c. Within the lower part of the part 40, is an annular recess as designated at 90 and in this recess circularly arranged, is an additional electrical heater 91 which is operative to maintain a suitable temperature to hold the consistency of the peanut butter so that is is flowable.

Just below the part 40 is a disc member 94 which is secured to the part 40. This disc has a center part 95 that provides a bearing for an arbor or stem 93 at the end of the delivery stem 80. The disc 94 is shown more in detail in FIGS. 9 and 10, these figures showing the screws 93 whereby it is secured to the part 40. It has central generally triangular shaped openings as designated at 96 in FIGS. 9 and 10.

In operation as will be described more in detail presently, the angularly positioned vanes on the lower side of the disc 86 cause the ground material, that is the peanut butter, to move inward radially and then to pass down through the openings 96 in the disc 94.

The grinding discs 84 and 86 are shown in detail in FIGS. 4–7. The upper disc is stationary as previously described, whereas the lower disc 86 rotates. These grinding discs are uniquely constructed for the purpose intended. In this machine a force is applied to the nuts so that they are pushed down to the grinding discs by way of the auger. Considerable force or pressure is exerted on the nuts. The purpose is to cause the nuts to be forced outwardly radially while they are being ground into the peanut butter and then to cause the peanut butter that has been formed to be forced inwardly radially again over the periphery of the lower disc to be picked up by the impellers to move the butter so it can be discharged through openings 96 radially into a cup.

The lower disc is rotated relative to the upper disc. Both discs have two outer circular rows of spaced teeth which are indicated by the numeral 89, in FIG. 4 and 89' in FIG. 5. These teeth and the grooves between them interleave between each other when the discs are in position and operating but the discs themselves do not rub together and wear out causing the necessity of frequent replacement that has been common in the prior art in the use of grinding discs, such as in coffee grinders. Coffee grinders produce a very fine powder wherein the machine of the herein invention produces butter only.

Both discs have central openings as described. Adjacent to the center opening in the upper disc, 84, is a further row of six teeth, equally spaced apart as identified at 90. There is a similar circular row of four teeth adjacent to the opening in the lower disc as identified by numer 95. The teeth in these rows just described as may be observed are larger. Their front faces are not aligned radially but are on an angle such as to cause the ground nuts to move outward radially. These teeth have a pyramidal configuration that may be seen, each one having a leading edge as just described, and each one having a trailing edge which slants down to the conical surface of the disc. The tooth configuration is best seen in plan in FIGS. 4 and 5. These teeth 90 and 95 having a slight slant on their outer surfaces.

Figure 4:
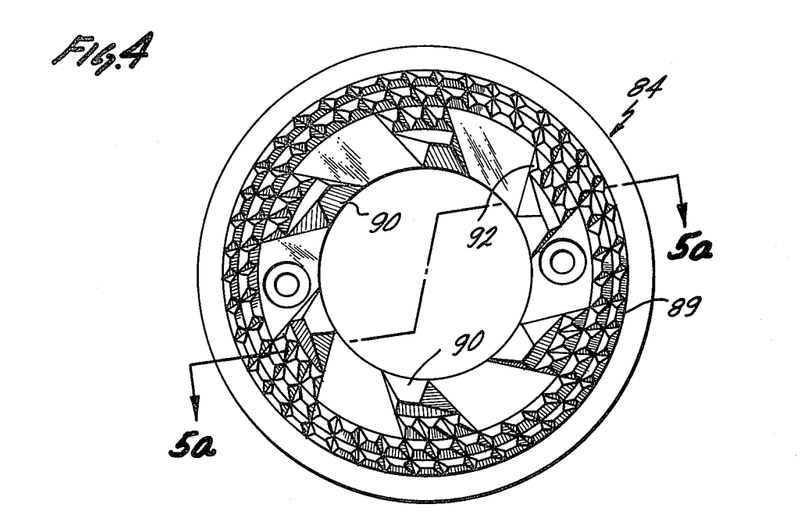
FIG. 4 is a detail view of the grinding surface of the top grinding disc.
Figure 5:
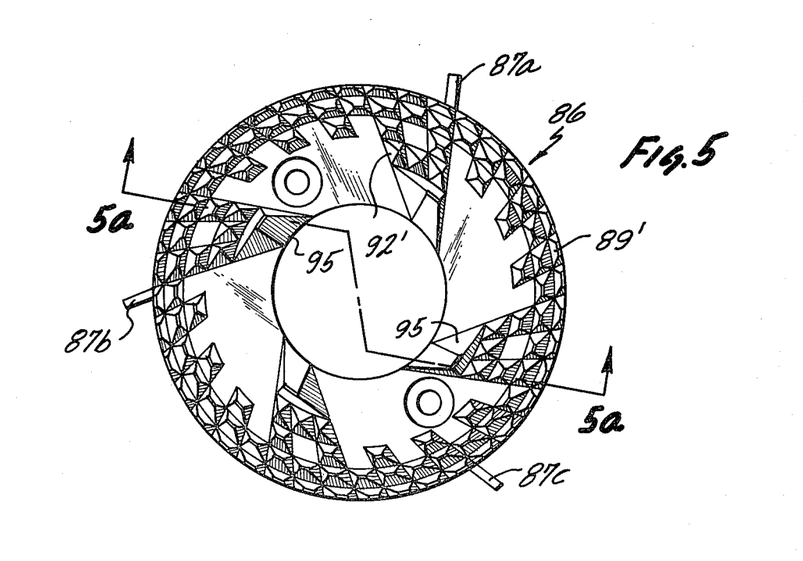
FIG. 5 is a view of the grinding surface of the rotatable disc
Figure 5A:
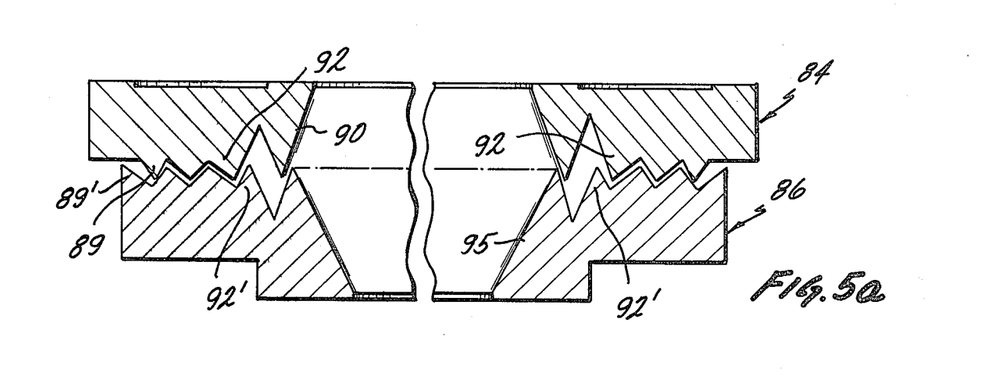
FIG. 5a is a cross-sectional view of the two discs.
Figure 6:
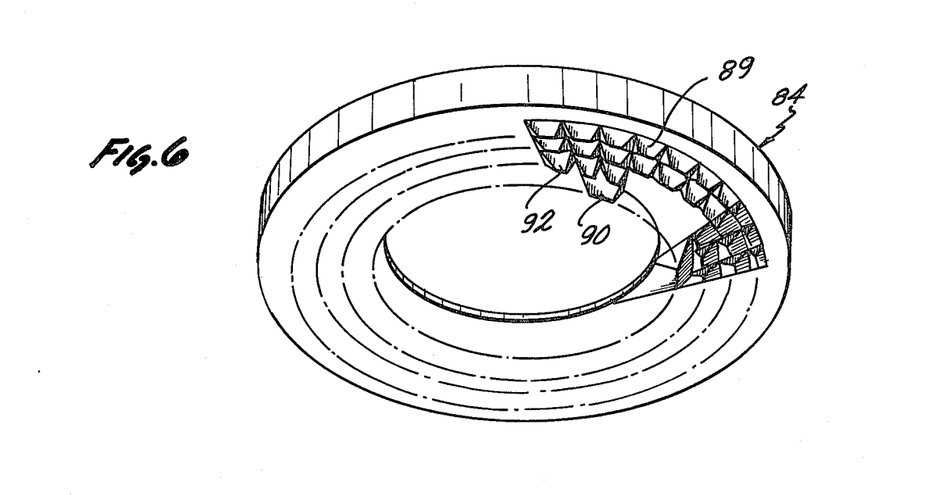
FIG. 6 is an isometric view partly in section of the upper grinding disc.
Figure 7:
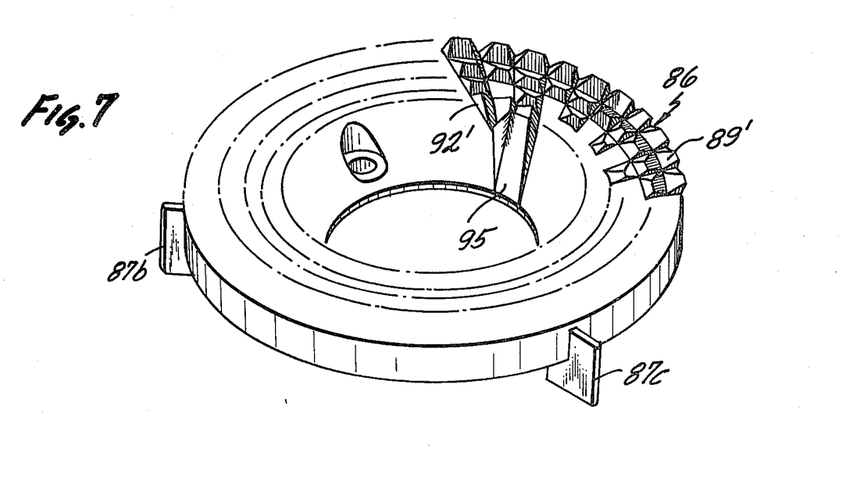
FIG. 7 is an isometric view partly in section of the rotating grinding disc.

In addition to the teeth as already described, on the upper disc 84, are further groups of teeth, one group of which is identified at 92 in FIG. 4 and at 92' in FIG. 5. These teeth are in groups between the large teeth, 90–95 and the outer complete circles of teeth on each side of the discs. These teeth and the grooves on opposite sides of the teeth on the two discs interleave with each other, and which are on the outside of the larger teeth, operate to allow the ground nuts to move outwardly without clogging, as described in the foregoing.

Referring again to the larger teeth, 90 and 95, the front face of these teeth is flat but on a slant as described. Four of these larger teeth on the lower disc and six on the upper disc with teeth as described are positioned adjacent the openings in the respective discs. These teeth, when interleaved as described in the foregoing, when they pass each other, they initially provide for shearing action on the nuts as they are entering the grinding discs under force from the auger. In a preferred form of the invention the lower disc is ⅜ inch smaller than the upper disc, so that the butter coming over the periphery of the lower disc will be moved radially inwardly by the impellers towards the center to be discharged to the center hole into the cup.

The configuration and confirmation of the teeth on the discs was established after substantial experimentation to arrive at a successfully operative design. The design has accomplished the objective of providing a spacing which will accomplish the grinding without clogging by allowing room for nuts to pass outwardly between teeth. It is to be observed that there are spaces between individual teeth of the circumferencial rows of teeth to allow the butter to pass outwardly.

The peanuts are forced by the delivery or conveyor mechanism to the grinding discs, the material passing outwardly radially between the teeth during grinding and the ground material, that is the peanut butter, then being moved radially inward by the vanes 87.

Numeral 44 designates the semi-circular shroud or closure positioned below the disc 94 and axially aligned with it. The door or closure 42 is semi-circular having a handle 102. See FIG. 9. At the lower edge of the closure member 44, there is provided a circular trackway 104 so that the closure member can be readily manually rotated between two positions, as illustrated in FIGS. 9 and 10.

The cup 46 that receives the peanut butter is carried on a stem 108 which extends down into the interior of the base 12. Within the base, is a scale mechanism including a beam 110 pivoted on a pivot 112. The pivot 112 is on a bracket including a plate 114 supported by members 115 and 116 within the base 12. One end of the beam 110 operates adjacent a spring finger 120 which can actuate a micro-switch 122.

Figure 3:
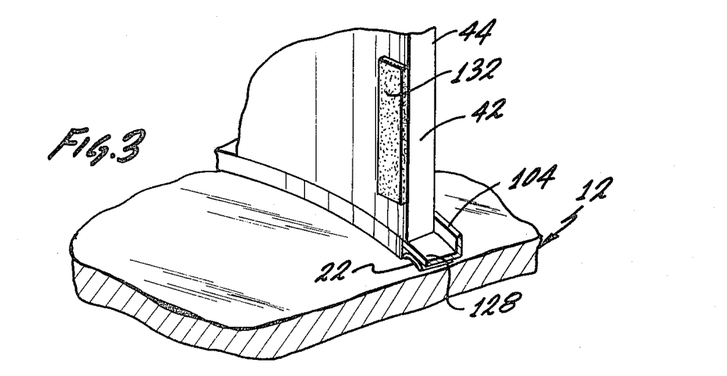
FIG. 3 is a detail view illustrating part of the automatic operation of the machine.

A micro-switch is provided which is actuated to closed position when the door 42 is closed. This microswitch is designated at 128 in FIG. 3, being in the form of a reed switch just below the top of the base 12. Carried on the door member 42 is a magnet 132. When the door is in closed position, the magnet 132 is brought into proximity to the reed switch 123 to actuate it.

The machine is constructed to be operated in response to automatic controls as will be described more in detail hereinafter. The machine has the capability of dispensing a product which may be either the conventionally known creamy peanut butter or crunchy peanut butter. The realization of this purpose is realized by way of apparatus as illustrated more in detail in FIG. 12. As may be seen in this Figure at a point in the periphery of the part 60 there is provided a downwardly extending tube 117 which threads into a fitting provided within the cylindrical member 36 as shown. Numeral 118 designates a tube aligned with the tube 117 and threaded into the cylindrical member 36 as shown, this tube extending downwardly through an opening in the part 40. Its end is inclined as shown at 119 so that nuts that have not passed through the grinder can be delivered into the cup 46.

Figure 12:
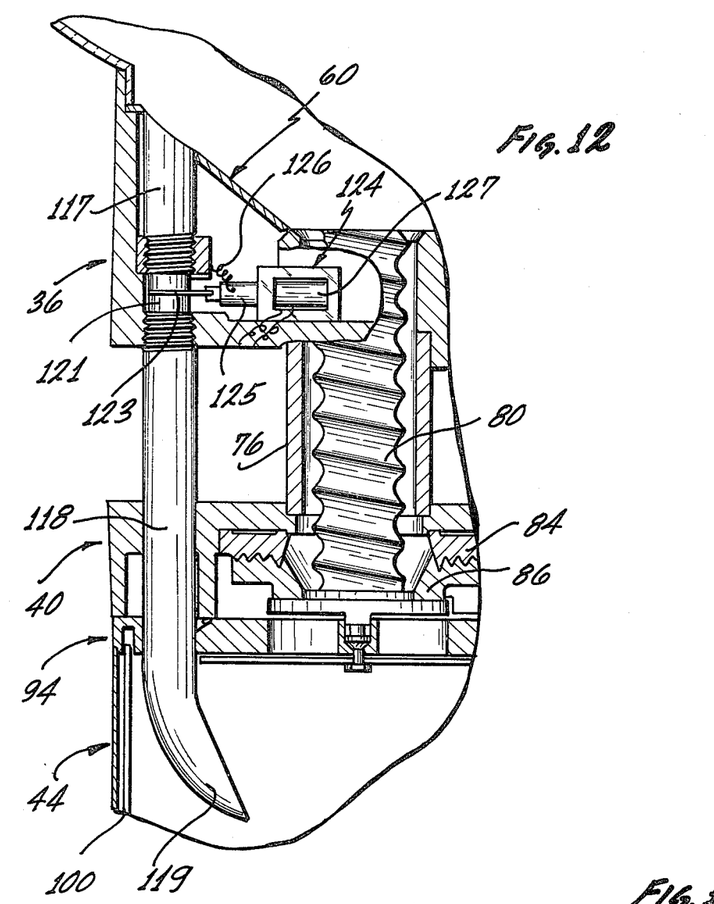
FIG. 12 is a partial sectional view taken along a plane through the machine as shown in FIG. 1 to show the mechanism for producing crunchy rather than creamy peanut butter.

In between the tubes 117 and 118 is a slide valve having a slide gate, or blade as designated at 123 which is actuatable by solenoid 124 having a plunger 125 attached to the blade 123, the solenoid having a winding 127. The valve formed by the ends of the tubes and the slide or blade 23 forms a gate valve, the blade 123 being the gate. As will be described the machine can be selectively operated so that creamy peanut butter is formed only from nuts that are ground or the machine can make the crunchy peanut butter product by way of the unground peanuts being fed through the tubes 117 and 118.

As previously described, the machine is preferably coin operated, there being a slot to receive a coin. This actuates a switch as designated at 136 in FIG. 11

Figure 11:
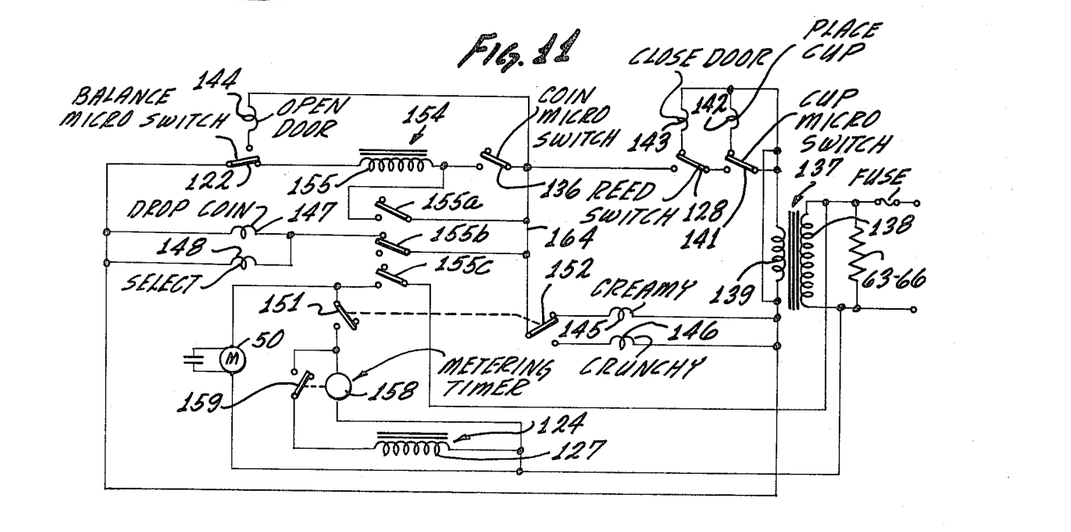
FIG. 11 is a schematic electrical circuit diagram of preferred circuitry for automatic operation of the machine.

FIG. 11 is a schematic circuit diagram of the preferred circuit arrangement to provide the automatic operations of the machine.

The power supply may be 150 volts 60 cycle power. The electrical heaters 63–66 are connected across the line which has a fuse in it as shown and this circuit may be controlled by a manual switch. Numeral 137 designates a transformer having a primary winding 138 and a secondary winding 139. The secondary winding 139 provides power for the circuitry shown in FIG. 11. Numerals 142, 143, 144, 145, 146, 147 and 148 designate indicator lights related to functions identified with the machine as will be described. The indicator lights may be appropriately positioned at a suitable control panel, such as the one shown in FIG. 13 or one near it.

Numeral 152 designates a manual selector switch for selecting a mode of operation of the machine, that is whether or not it is desired to produce the creamy or crunchy peanut butter. Numeral 154 is a relay having a winding 155 and which operates relay switches or contacts 155a, 155b, 155c. Numeral 158 designates a metering timer which controls a switch 159 which is in the circuit of the solnoid 124 which controls the shutter or gate valve that is in the conduit which delivers unground nuts for producing the crunchy peanut butter.

FIG. 11 shows switch 141 that is operated by placement of the cup for the peanut butter, the switch 128 that is operated by the door 42 and the switch 122 which is the weight actuated switch.

Figure 13:
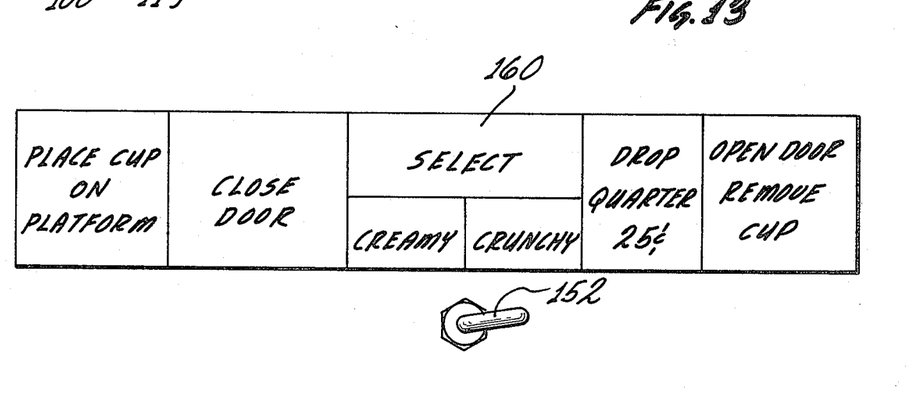
FIG. 13 is an illustration of a panel with instruction legends that may be applied to the base of the machine or to any other convenient surface on the machine.

The operation of the machine is as follows, the operator being guided by the legends on the panel 160 as shown in FIG. 13. This panel may be on the base 12 as shown in FIG. 1. At the outset the hopper of the machine is filled with peanuts and the compartment 44 is open with the indicator light 142 on. The customer places a plastic cup from an adjacent dispenser on the platform on the inside of the compartment. This causes the indicator light to be turned off and the indicator light 143 is on indicating that the door 42 is open. The customer closes door 142 causing the indicator light 143 to be turned off and indicator lights 147 and 148 to be turned on.

The operator then actuates the switch 152 to one of its positions to select either the creamy or crunchy mode of operation, one of the signal lights 145 or 146 then coming on. This closes the contact 151 controlling the metering timer 158; if the crunchy mode is desired.

The operator now drops a coin in the slot, closing contact 136 and thereby energizing relay 154 through the contact 122 and closing contacts 155a, 155b and 155c. Contact 155a completes a holding circuit for relay 154 by-passing contact 136.

Contact 155b de-energizes circuits for the signal lights 147 and 148. Contact 155c completes a circuit for the grinding motor 50. If contact 151 has closed, the crunch product having been selected, the circuit is completed for the metering timer 158.

When the proper amount of peanut butter fills the cup the balance tips, opening the contact 122 and thus de-energizing relay 154 and causing light 144 to come on. All the circuits are now de-energized, the customer can open the compartment door and remove the cup from the platform so the indicator light indicating the door is open is off and the indicator light for placing the cup is on. The cycle is ready to be started again.

From the foregoing, those skilled in the art will readily understand the nature and construction of the invention and the manner in which it realizes all of the objects as set forth in the foregoing. The machine is constructed to be positive and effective in its operation and having the characteristic that it can readily be controlled by a coin operated mechanism to operate automatically and to deliver a measured amount of pure unadulterated peanut butter. The particular construction and arrangement of parts is such as to make possible the realization of the objectives set forth in the foregoing.

The foregoing disclosure is representative of a preferred form of the invention and is to be interpreted in an illustrative rather than a limiting sense, the invention to be accorded the full scope of the claims appended hereto.

I claim:

1. In a machine for grinding nuts for producing nut butter, in combination, vertically oriented means for holding a supply of nuts to be ground, grinding means, including horizontal grinding discs, one of which is rotated relative to the other, vertically oriented screw means for delivering the nuts to be ground into central opening means in the grinding discs, the discs having relatively movable grinding teeth positioned to cause the nuts being ground to move outwardly radially between the grinding discs to the periphery of the discs, and the lower disc being rotated, means for causing all of the ground material, after being ground and passing outwardly of said discs, to be moved inwardly toward the central axis of the discs below said lower disc.

2. Apparatus as in claim 1, wherein the delivery means includes means for delivering the nuts under pressure through opening means in the central region of one of the grinding discs the lower disc having vanes on its lower side wherein the ground material is directed radially inwardly to an opening aligned with the axis of the upright delivering means.

3. Apparatus as in claim 1, wherein the discs have circular rows of teeth, rows of teeth on one disc being positioned to interleave between rows of teeth on the other disc.

4. Apparatus as in claim 3, wherein the teeth around the discs are in rows in a direction from the inside of the disc towards the periphery, said rows being at an angle, slanted with respect to a radius, the outer end of the rows being slanted rearwardly as relative to the direction of travel.

5. Apparatus as in claim 4, wherein the teeth on both of the grinding discs have a leading cutting edge and a trailing edge, the teeth being relatively oriented, such that the leading cutting edge of the teeth on one disc, during rotation, moves towards the leading cutting edge of the teeth on the opposite disc.

6. Apparatus as in claim 3 wherein each disc has circular rows of larger teeth spaced inwardly from the aforesaid rows with the larger teeth on the discs being in position to have an interleaving relationship to provide for shearing action on the nuts as they are entering the grinding discs.

7. Apparatus as in claim 6 wherein the lower disc has a central part of conical configuration, the larger teeth having a pyramidal configuration each tooth having a trailing edge having a surface which slants down to the conical surface of the disc.

8. A machine for grinding nuts for producing nut butter including in combination, a hopper for holding a supply of nuts to be ground, nut grinding means including horizontal grinding discs spaced from said hopper, said hopper being positioned vertically over the grinding means, delivery means for delivering nuts from the hopper to the center of the grinding means and forcing the nuts being ground outwardly from between the discs, and means for receiving the ground material after passing through the grinding means, means for applying heat to the nuts before passing into the grinding means, said heat applying means being positioned at the lower part of the hopper, and means for causing all of the ground material after it passes the discs to be moved inwardly to a discharge opening aligned with the center of the said discs.

9. Apparatus as in claim 8 including additional delivery means for delivering unground nuts from the hopper to mix with the ground material passing through the grinding means for producing crunchy peanut butter.

10. Apparatus as in claim 9 including a gate valve means in said additional delivery means and control means whereby to selectively cause unground nuts to be delivered.

11. Apparatus as in claim 9, wherein the apparatus includes a chamber below the said grinding discs and aligned with them, said additional delivery means including a conduit having an end part connected to an outer part of the hopper and extending down to said chamber for delivering unground nuts to the ground material that has passed through the discs.

* * * * *